United States Patent
Varma et al.

(10) Patent No.: US 10,515,174 B1
(45) Date of Patent: Dec. 24, 2019

(54) INTERFACE MODELING FOR POWER ANALYSIS OF AN INTEGRATED CIRCUIT

(71) Applicant: Cadence Design Systems, Inc., San Jose, CA (US)

(72) Inventors: Avnish Varma, Noida (IN); Rishabh, Patna (IN); Xin Gu, Austin, TX (US)

(73) Assignee: CADENCE DESIGN SYSTEMS, INC., San Jose, CA (US)

( * ) Notice: Subject to any disclaimer, the term of this patent is extended or adjusted under 35 U.S.C. 154(b) by 0 days.

(21) Appl. No.: 16/051,277

(22) Filed: Jul. 31, 2018

(51) Int. Cl.
*G06F 17/50* (2006.01)

(52) U.S. Cl.
CPC ...... *G06F 17/5068* (2013.01); *G06F 17/5031* (2013.01); *G06F 17/5045* (2013.01)

(58) Field of Classification Search
CPC ............. G06F 17/5068; G06F 17/5031; G06F 17/5045
See application file for complete search history.

(56) References Cited

U.S. PATENT DOCUMENTS

| | | | | |
|---|---|---|---|---|
| 6,480,987 B1* | 11/2002 | McBride | ............ | G06F 17/5036 716/113 |
| 6,529,861 B1* | 3/2003 | Patra | ..................... | G06F 17/505 703/13 |
| 6,807,520 B1* | 10/2004 | Zhou | ................... | G06F 17/5022 703/14 |
| 7,032,206 B2* | 4/2006 | Keller | ................. | G06F 17/5022 716/129 |
| 7,047,507 B2* | 5/2006 | Keller | ................. | G06F 17/5036 716/115 |
| 7,058,908 B2* | 6/2006 | Keller | ................. | G06F 17/5022 716/115 |
| 7,272,805 B2* | 9/2007 | McGaughy | ......... | G06F 17/5045 716/103 |
| 7,844,438 B1 | 11/2010 | Verghese et al. | | |
| 7,979,820 B1* | 7/2011 | Patzer | ................. | G06F 17/5036 703/13 |
| 8,069,024 B1* | 11/2011 | Croix | .................. | G06F 17/5036 703/14 |
| 8,161,448 B1* | 4/2012 | Croix | .................. | G06F 17/5036 716/136 |
| 8,365,113 B1* | 1/2013 | Bhardwaj | ............. | G06F 17/505 716/104 |
| 8,566,767 B1 | 10/2013 | Kukal et al. | | |

(Continued)

*Primary Examiner* — Nha T Nguyen
(74) *Attorney, Agent, or Firm* — Foley & Lardner LLP

(57) ABSTRACT

The present embodiments relate to generation of an interface model for performing a power analysis on a hierarchical integrated circuit design. According to some aspects, embodiments relate to a method of power analysis. The method can include partitioning an integrated circuit design into at least a first partition and a second partition sharing an interface with the first partition. The method can include generating a connectivity database of a signal net traversing from the first partition to the second partition across the first interface. The method can include determining a slew rate and a signal arrival time at the input pin of the destination cell, a capacitance load of the signal net, and one or more signal transitions and signal states on the signal net. The method can include calculating the power consumption of the circuit elements in the first partition using the connectivity database, and the determined information.

20 Claims, 6 Drawing Sheets

(56) References Cited

U.S. PATENT DOCUMENTS

| | | | |
|---|---|---|---|
| 8,694,302 B1* | 4/2014 | Ho | G06F 17/5036 |
| | | | 703/14 |
| 8,738,335 B1* | 5/2014 | Ho | G06F 17/5036 |
| | | | 703/14 |
| 8,788,995 B1 | 7/2014 | Kumar et al. | |
| 8,954,917 B1 | 2/2015 | Shu et al. | |
| 9,619,604 B1 | 4/2017 | Rai et al. | |
| 9,881,120 B1 | 1/2018 | Ginetti et al. | |
| 2002/0170026 A1* | 11/2002 | Katayose | G06F 17/5068 |
| | | | 716/114 |
| 2004/0003360 A1* | 1/2004 | Batchelor | G06F 17/5031 |
| | | | 716/113 |
| 2004/0025129 A1* | 2/2004 | Batchelor | G06F 17/5031 |
| | | | 716/113 |
| 2010/0269083 A1* | 10/2010 | Sinha | G06F 17/5031 |
| | | | 716/102 |
| 2011/0016442 A1* | 1/2011 | Abbaspour | G06F 17/5031 |
| | | | 716/108 |
| 2011/0224965 A1* | 9/2011 | Hathaway | G06F 17/5036 |
| | | | 703/16 |

* cited by examiner

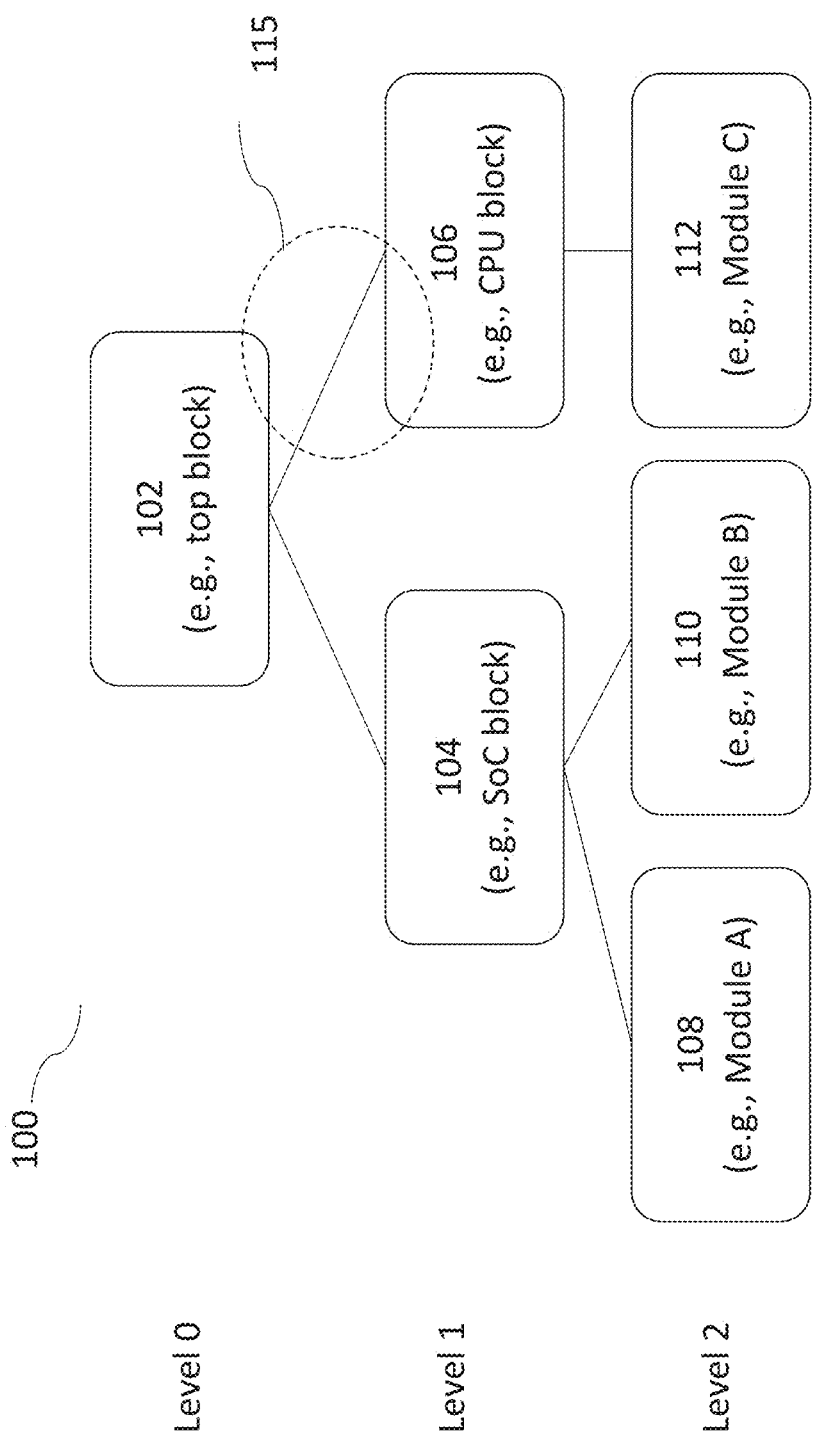

INTERFACE MODELING FOR POWER ANALYSIS OF AN INTEGRATED CIRCUIT

TECHNICAL FIELD

The present disclosure relates generally to integrated circuits, including but not limited to methods and apparatuses for performing power analysis on integrated circuits.

BACKGROUND

Integrated circuits can include many thousands and perhaps millions of circuit elements (e.g., transistors, logic gates, diodes) and interconnecting wires and busses. Electronic design automation (EDA) tools are generally used to design such integrated circuits. The EDA tools can be used to perform power analysis on the integrated circuits to access a power consumption level of the design so that optimization, if needed, can be made to ensure that a final design implementation can meet certain power requirements.

SUMMARY

The present embodiments relate to generation of an interface model for performing a power analysis on a hierarchical integrated circuit design. According to some aspects, embodiments relate to a method of power analysis. The method can include partitioning an integrated circuit design into at least a first partition and a second partition sharing an interface with the first partition, for calculating power consumption of circuit elements in the first partition. The method can include generating a connectivity database of a signal net traversing from the first partition to the second partition across the first interface, wherein the connectivity database comprises an identification of the signal net in the first partition, the signal net in the second partition, and an input pin of a destination cell of the signal net in the second partition. The method can include determining a slew rate and a signal arrival time at the input pin of the destination cell, a capacitance load of the signal net, and one or more signal transitions and signal states on the signal net or on the input pin of the destination cell. The method can include calculating the power consumption of the circuit elements in the first partition using the generated connectivity database, the slew rate and the signal arrival time at the input pin of the destination cell, the capacitance load of the signal net, and the one or more signal transitions and signal states on the signal net or on the input pin.

According to some aspects, embodiments relate to a system for power analysis. The system includes one or more processors. The one or more processors can identify a first partition of an integrated circuit design and a second partition of the integrated circuit design sharing an interface with the first partition, for calculating power consumption of circuit elements in the first partition. The one or more processors can generate a connectivity database of a signal net traversing from the first partition to the second partition across the first interface. In some embodiments, the connectivity database includes an identification of the signal net in the first partition, the signal net in the second partition, and an input pin of a destination cell of the signal net in the second partition. The one or more processors can determine a slew rate and a signal arrival time at the input pin of the destination cell, a capacitance load of the signal net, and one or more signal transitions and signal states on the signal net or on the input pin of the destination cell. The one or more processors can calculate the power consumption of the circuit elements in the first partition using the generated connectivity database, the slew rate and the signal arrival time at the input pin of the destination cell, the capacitance load of the signal net, and the one or more signal transitions and signal states on the signal net or on the input pin.

According to some aspects, embodiments relate to a computer readable storage medium having instructions stored thereon which, when executed by a computer, cause the computer to execute a method for performing a power analysis on an integrated circuit. The method can include identifying a first partition of an integrated circuit design and a second partition of the integrated circuit design sharing an interface with the first partition, for calculating power consumption of circuit elements in the first partition. The method can include generating a connectivity database of a signal net traversing from the first partition to the second partition across the first interface. The connectivity database can include an identification of the signal net in the first partition, the signal net in the second partition, and an input pin of a destination cell of the signal net in the second partition. The method can include determining a slew rate and a signal arrival time at the input pin of the destination cell, a capacitance load of the signal net, and one or more signal transitions and signal states on the signal net or on the input pin of the destination cell. The method can include calculating the power consumption of the circuit elements in the first partition using the generated connectivity database, the slew rate and the signal arrival time at the input pin of the destination cell, the capacitance load of the signal net, and the one or more signal transitions and signal states on the signal net or on the input pin.

BRIEF DESCRIPTION OF THE DRAWINGS

These and other aspects and features of the present embodiments will become apparent to those ordinarily skilled in the art upon review of the following description of specific embodiments in conjunction with the accompanying figures, wherein:

FIG. 1A illustrates a hierarchical representation of an integrated circuit design, according to present embodiments;

DETAILED DESCRIPTION

Figure 1B:
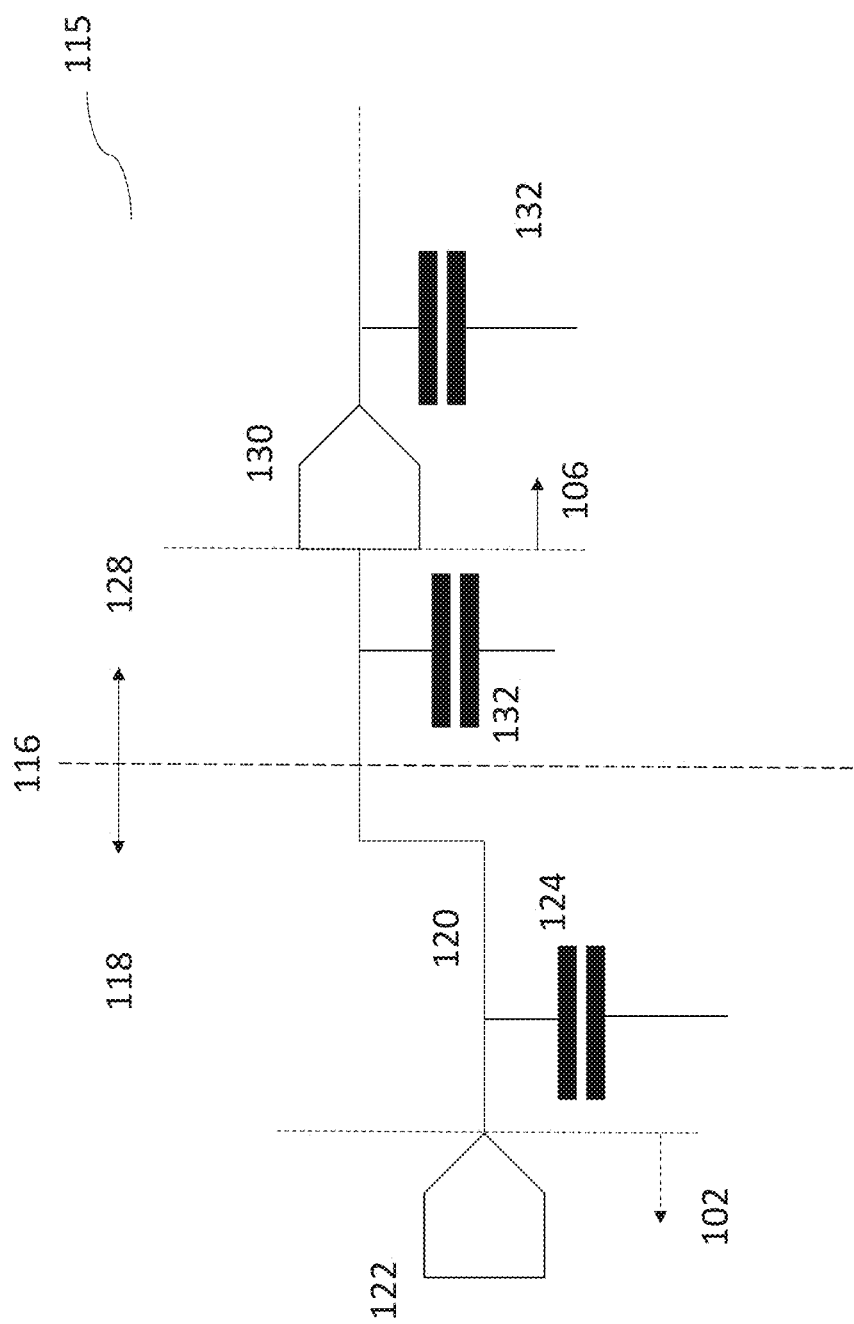
FIG. 1B illustrates a schematic diagram of an interface portion of the integrated circuit design of FIG. 1A, according to present embodiments.

The present embodiments will now be described in detail with reference to the drawings, which are provided as illustrative examples of the embodiments so as to enable those skilled in the art to practice the embodiments and alternatives apparent to those skilled in the art. Notably, the figures and examples below are not meant to limit the scope of the present embodiments to a single embodiment, but other embodiments are possible by way of interchange of some or all of the described or illustrated elements. Moreover, where certain elements of the present embodiments can be partially or fully implemented using known components, only those portions of such known components that are necessary for an understanding of the present embodiments will be described, and detailed descriptions of other portions of such known components will be omitted so as not to obscure the present embodiments. Embodiments described as being implemented in software should not be limited thereto, but can include embodiments implemented in hardware, or combinations of software and hardware, and vice-versa, as will be apparent to those skilled in the art, unless otherwise specified herein. In the present specification, an embodiment showing a singular component should not be considered limiting; rather, the present disclosure is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present embodiments encompass present and future known equivalents to the known components referred to herein by way of illustration.

An integrated circuit may contain millions, if not billions, of components such as transistors, resistors, and capacitors. The design of such an integrated circuit (IC) may involve multiple teams of engineers. It can be advantageous to partition the design of such complex integrated circuit using a hierarchical approach, whereby certain circuit components are grouped together into a design block to simplify development of the design, and in some cases can be reused within the same IC chip or in a subsequent design.

FIG. 1A illustrates an example of an integrated circuit design 100 represented in a hierarchical fashion. In some embodiments, such a hierarchical design 100 may be referred to as a hierarchical netlist. As shown, the design 100 can include one or more (hierarchical) levels, each of which can include one or more blocks, partitions or modules, for example, a level 0 that includes a top block 102, a level 1 that includes a System-on-Chip (SoC) block 104 and a Central Processing Unit (CPU) block 106, and a level 3 that includes Module A 108, Module B 110, and Module C 112. Further, each of the blocks in the design 100 may be configured to perform a certain function, and includes one or more inputs and outputs that can be respectively connected to block(s), or module(s), located at the same or other levels, causing the whole design 100 to perform a desired function. In order to reduce resource requirements (e.g., memory and computational runtime) and/or to simplify various types of analyses (e.g., signal integrity analysis, power analysis) of a hierarchical design, some of the blocks may be treated as a "black box," whose input and output ports may be known, but whose contents are not analyzed or considered. Such blocks can be analyzed individually as well. In other words, various portions of the design can be partitioned and analyzed separately, in a divide-and-conquer approach.

Although using such a hierarchical approach to analyze performance of the design 100 may decrease calculation complexity thereby saving time and/or resource, it can result in various issues such as, for example, inaccuracy of the analysis results or performance, etc. For instance, while using existing techniques to analyze the power consumption of the design 100, each of the blocks or modules 102 to 112, can be analyzed independently, and can also be treated as a black box (e.g., without considering the contents of each black box) within a higher level design, to estimate a respective output of power consumption. The respective power consumption outputs can then be aggregated to estimate an overall power consumption of the design 100. It is, however, noted that one or more components (e.g., logic gates) disposed at an interface portion between adjacent blocks and/or modules (e.g., indicated as an interface portion 115 in FIG. 1A) are not considered in estimating the overall power consumption of the design 100. Further, since each of the blocks or modules 102 to 112 is treated as a black box, various characteristics or properties at the interface portion 115 are not considered, which shall be described in further detail with respect to FIG. 1B. Accordingly, the hierarchical approach for performing power consumption estimation on the design 100 may not be accurate, which can affect any subsequent analysis that is based on the power consumption estimation (e.g., voltage drop analysis).

FIG. 1B illustrates an example of at least a portion of the components at the interface portion 115 in a greater detail. As shown in this example, the interface portion 115 includes a symbolic or logical interface boundary, or interface 116 (hereinafter "interface 116"), that separates the design around interface portion 115 into partitions 118 and 128 that are located at level 0 and level 1, respectively (FIG. 1A). The interface portion 115 may include a signal net 120, which may be one of a plurality of interconnection lines connecting the top block 102 at level 0 with the CPU block 106 at level 1. Specifically, the signal net 120 traverses from an input/output (I/O) port 122 of the top block 102, across the interface 116, through an I/O port (or pin) 130 of the CPU block 106, and to a component or cell (not shown) of the CPU block 106.

As mentioned above, while using existing techniques to estimate the power consumption of the design 100, several factors (properties, characteristics) at the interface portion 115 are not taken into consideration such as, for example, for the signal net 120 connected from the partition 118 to partition 128, what is the capacitance load 124 along the signal net 120 at the partition 118, the capacitance load 132 along the signal net 120 at the partition 128, the capacitance load 132 along the signal net 120 as seen at the input pin of a destination cell of the signal net 120, etc. Since such missing information at the interface portion 115 can affect the power consumption estimation on the top block 102 and/or CPU block 106 to a significant extent, estimating the power consumption of the top block 102 and/or CPU block 106 without considering such factors at the interface portion 115 may be subjected to various levels of inaccuracy.

The discussion below provides an electronic design automation (EDA) system or tool to facilitate and/or perform power analysis on integrated circuits by generating one or more interface port models to consider or address the above-identified factors at interface portions (e.g., 115). In some embodiments, each of the interface port models may include a connectivity database of a signal net traversing across an interface between two partitions, which can be in different (hierarchical) levels or at a same (hierarchical) level, as well as various electrical characteristics associated with the signal net. Further, the disclosed EDA system or tool can extract or receive relevant information from one or more files and/or analysis engines to generate the connectivity database of the signal net and determine the electrical characteristics associated with the signal net. The disclosed EDA system or tool shall be discussed in further detail below.

Figure 2:
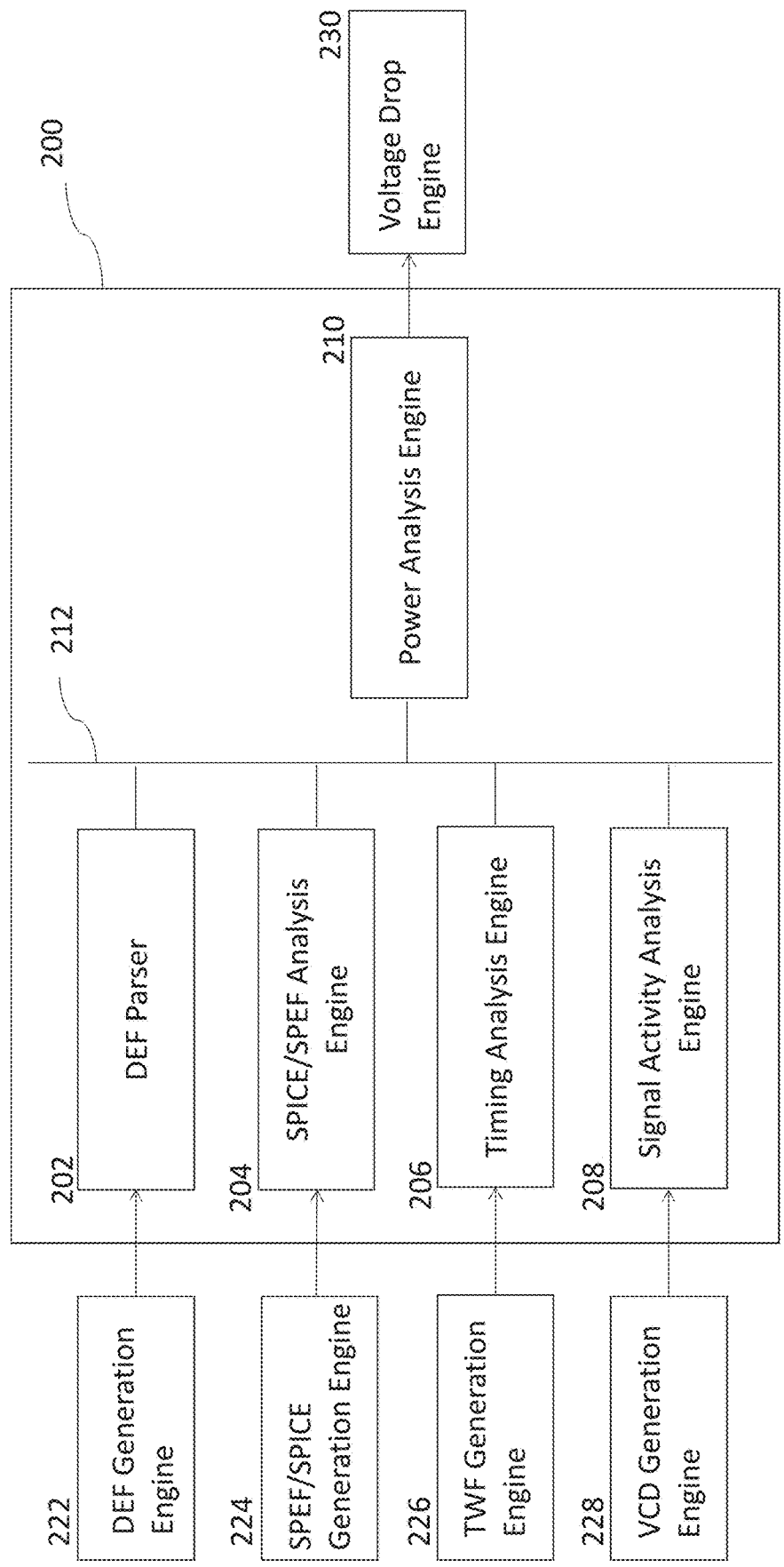
FIG. 2 illustrates a block diagram of a power analysis tool, according to the present embodiments.

FIG. 2 illustrates an example block diagram of an EDA system or tool 200 to facilitate and/or perform power analysis on integrated circuits (hereinafter "power analysis tool 200"), in accordance with various embodiments of the present disclosure. As shown, the power analysis tool 200 can include one or more of: a design exchange format (DEF) parser 202, a simulation program with integrated circuit emphasis/standard parasitic exchange format (SPICE/SPEF) analysis engine 204, a timing analysis engine 206, a signal activity analysis engine 208, and a power analysis engine 210. In some embodiments, the above-mentioned parser/engines are coupled together by a bus system 212. The bus system 212 can include a data bus and, for example, a power bus, a control signal bus, and/or a status signal bus in addition to the data bus. It is understood that the parser/engines of the power analysis tool 200 can be operatively coupled to one another using any suitable techniques and mediums.

Further, in some embodiments, each of the parser/engines of the power analysis tool 200 may be communicatively coupled to one or more other engines through respective interfaces to receive and/or transmit data or file(s). For example, the DEF parser 202 may be communicatively coupled to a DEF generation engine 222 through an interface (not shown) to receive a DEF file, and/or a library exchange format (LEF) file (or other file/data that describes circuitry connectivity or provides netlist information), of an integrated circuit design from the DEF generation engine 222; the SPICE/SPEF analysis engine 204 may be communicatively coupled to a SPICE/SPEF generation engine 224 through an interface (not shown) to receive a SPICE model (e.g., a model or representation of extracted parasitics of nets) and/or a SPEF file in association with the integrated circuit design from the SPICE/SPEF generation engine 224; the timing analysis engine 206 may be communicatively coupled to a timing window file (TWF) generation engine 226 (e.g., a static timing analysis (STA) tool) through an interface (not shown) to receive a TWF file/data in association with the integrated circuit design from the TWF generation engine 226; the signal activity analysis engine 208 may be communicatively coupled to a value change dump file (VCD) generation engine 228 (e.g., a functional or gate-level simulation tool) through an interface (not shown) to receive a VCD, switching activity interchange format (SAIF) or other activity file/data in association with the integrated circuit design from the VCD generation engine 228; and the power analysis engine 210 may be communicatively coupled to a voltage drop analysis engine 230 through an interface (not shown) to provide power consumption data in association with the integrated circuit design to the voltage drop analysis engine 230. In some embodiments, some or all of the parser/engines of the power analysis tool 200 may not be communicatively coupled to a respective engine as described above. Instead, such parser/engines can include an interface to receive, import and/or process the respective files/data (e.g., VCD file or SPICE model).

Although the DEF generation engine 222, SPICE/SPEF generation engine 224, TWF generation engine 226, VCD generation engine 228, and voltage drop analysis engine 230 are shown as being separated from the power analysis tool 200, respectively, in the illustrated embodiment of FIG. 2, it is understood that some or all of the engines can be integrated with the power analysis tool 200 while remaining within the scope of the present disclosure.

In some embodiments, in response to receiving the DEF file of an integrated circuit design, which can include a netlist and/or circuit description of the integrated circuit design, from the DEF generation engine 222, the DEF parser 202 may be configured to read the DEF file to retrieve and/or generate netlist and/or circuit descriptions of the integrated circuit design across one or more identified partitions or interfaces (e.g., 115, 116), in accordance with a hierarchical description or partitioning of the IC design for instance. As such, the integrated circuit design may be represented as a hierarchical netlist (e.g., the hierarchical netlist of FIG. 1A). In response to the hierarchical description, the DEF parser 202 may identify one or more signal nets, each of which traverses from one of the plurality of partitions (herein "first partition") to another of the plurality of partitions (herein "second partition") across a respective interface, and generate a connectivity database of each of the identified signal nets. More specifically, each connectivity database can includes an identification of the respective signal net in the first partition, an identification of the respective signal net in the second partition, and an input pin of a destination cell of the respective signal net in the second partition, etc., which shall be discussed in further detail below with respect to FIGS. 2 and 3.

According to some embodiments, simultaneously with or subsequently to the generation of the connectivity database of each of the identified signal nets, the SPICE/SPEF analysis engine 204, the timing analysis engine 206, and/or the signal analysis engine 208 may be used to concurrently or respectively determine a respective number of electrical characteristics associated with each of the identified signal nets.

More specifically, the SPICE/SPEF analysis engine 204 may be configured to determine, calculate or extract capacitance load information of each identified signal net based on the SPICE model and/or SPEF file received from the SPICE/SPEF generation engine 224. The timing analysis engine 206 may be configured to determine a slew rate and/or a signal arrival time (sometimes referred to as delay or signal delay) at the input pin of the destination cell of each identified signal net based on the TWF data (or timing data in another format) received from the TWF generation engine 226. The signal activity analysis engine 208 may be configured to determine one or more signal transitions and/or signal states on each identified signal net or on the input pin of the destination cell based on the VCD file (or data provided in another format) received from the VCD generation engine 228, which shall be discussed in further detail below with respect to FIGS. 2 and 3.

According to some embodiments, in response to determining, obtaining and/or generating the connectivity database and electrical characteristics of each of the identified signal nets (e.g., at an interface), the power analysis engine 210 may be configured to generate an interface port model for each of the identified signal nets, that includes respective connectivity database and electrical characteristics. The power analysis engine 210 can use the generated interface port models to estimate power consumption of the integrated circuit design, which shall be discussed in further detail below with reference to FIGS. 2 and 3. The term "configured to", as used herein with respect to a specified operation or function, refers to a device, component, circuit, structure, machine, signal, etc., that is physically constructed, programmed, formatted and/or arranged to perform the specified operation or function.

In some embodiments, the generated interface port models can be each established as a file, database/collection of files, or a collection of information stored or maintained in memory, etc. For example, the connectivity database and electrical characteristics of an interface port model may be separately established as respective files or databases, or the connectivity database and electrical characteristics of the interface port model may be combined into a single file or database in another standard format.

Figure 3:
FIG. 3 illustrates a flow chart of an example process to perform power analysis on an integrated circuit design, according to the present embodiments.

FIG. 3 illustrates a flow chart of an example process 300 to facilitate and/or perform power analysis on an integrated circuit design, in accordance with various embodiments of the present disclosure. It is noted that the process 300 is merely an example, and is not intended to limit the present disclosure. Additional operations can be provided before, during, and after the process 300, and some operations described below can be replaced, eliminated, or move around in accordance with additional embodiments. In some embodiments, the power analysis tool 200 (FIG. 2) may perform the process 300 on an integrated circuit design 400 (FIG. 4), for example. For purpose of clarification, the process 300 is described below in conjunction with FIGS. 2 and 4.

The process 300 can include partitioning an integrated circuit design to a first partition and second partition with an interface therebetween (operation 302). In some embodiments, the operation 302 may include partitioning the integrated circuit design to any desired number of partitions greater than 2, while remaining within the scope of the present disclosure. In some embodiments, the DEF parser 202 of the power analysis tool 200 (FIG. 2) may be configured to partition the integrated circuit design, which is received as a DEF file, into at least the first and second partitions.

Using the integrated circuit design 400 as an example, responsive to receiving the DEF file of the integrated circuit design 400 (e.g., from the DEF generation engine 222) and/or a hierarchical netlist or description of the integrated circuit design 400, the DEF parser 202 may determine or consider a plurality of partitions 402, 404, 406, and 408 of the integrated circuit design 400 into. In some embodiments, one or more of the plurality of partitions 402, 404, 406, and 408 may be located at a same level in a hierarchical netlist, or the plurality of partitions 402, 404, 406, and 408 may be portioned to be located at respective different levels in the hierarchical netlist. For example, the partition 402 may represent the top block 102 of FIG. 1A, which is located at level 0, the partition 404 may represent the CPU block 106 and the partition 406 may represent the SoC block 104 of FIG. 1A, which are both located at level 1, and the partition 408 may represent the Module A block 108 of FIG. 1A, which is located at level 2.

Further, in response to partitioning the integrated circuit design 400 into the partitions 402, 404, 406, and 408, the DEF parser 202 may identify a respective interface separating two abutted partitions. Continuing with the example above, the DEF parser 202 may identify an interface 403 separating the partitions 402 and 403; an interface 405 separating the partitions 402 and 406; and an interface 407 separating the partitions 406 and 408.

Referring back to FIG. 3, the process 300 can include identifying a signal net traversing from the first partition to second partition across the interface (operation 304). According to some embodiments, in response to partitioning the integrated circuit design to the first and second partitions with the interface, the DEF parser 202 (FIG. 2) may be configured to identify at least a signal net traversing from the first partition to second partition across the interface. Further, as mentioned above, the DEF parser 202 may partition the design to more than 2 partitions. As such, the signal net, identified by the DEF parser 202, may traverse from a first partition to a second partition across a first interface, and further traverse from the second partition to a third partition across a second interface.

Figure 4:
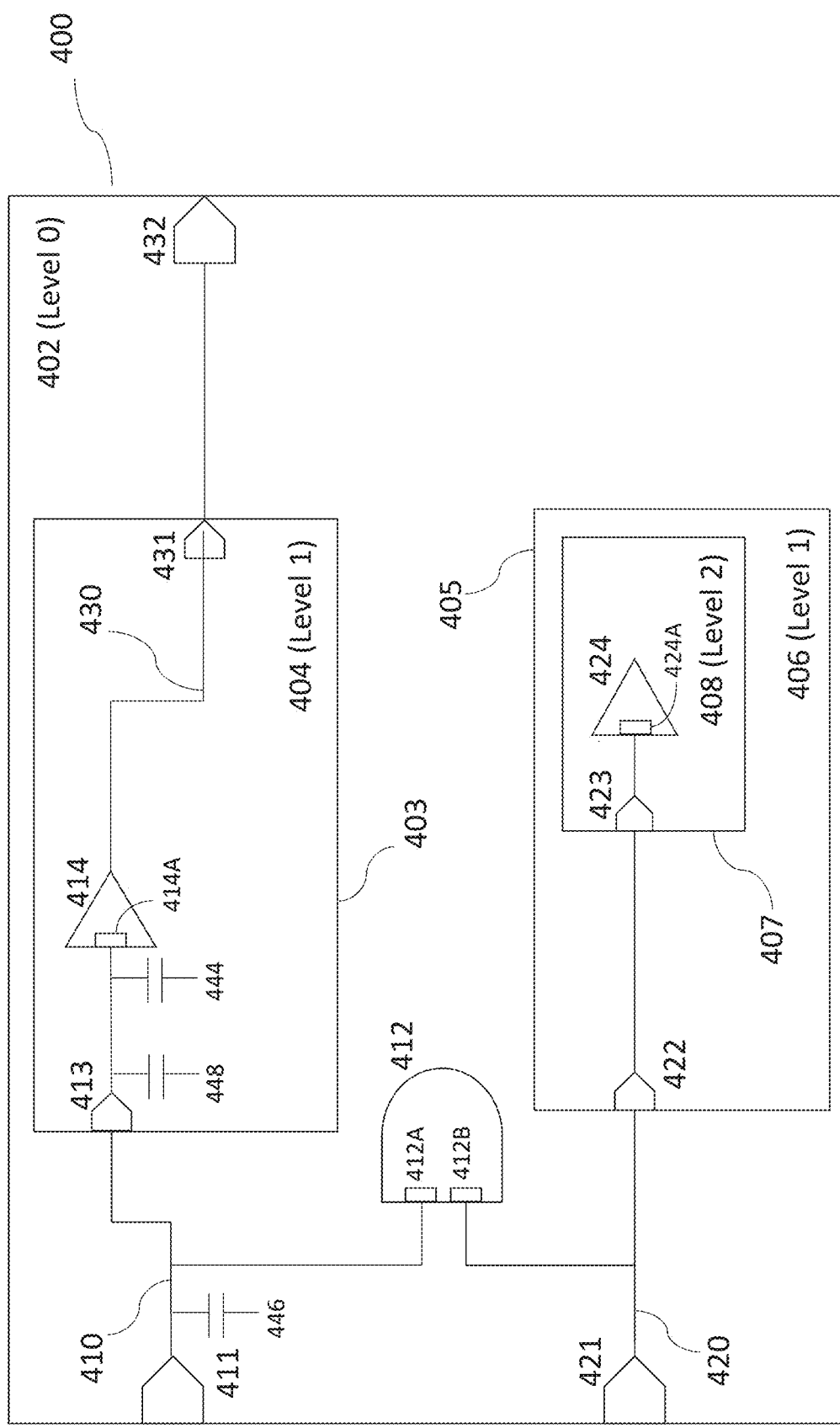
FIG. 4 illustrates an example schematic diagram of an integrated circuit design that can be analyzed by the process of FIG. 3, according to the present embodiments.

Using the example shown in FIG. 4, the DEF parser 202 may identify a signal net 410 traversing from the partition 402 to the partition 404 across the interface 403; a signal net 420 traversing from the partition 402 to the partition 406 across the interface 405, and further traversing from the partition 406 to the partition 408 across the interface 407; and a signal net 430 traversing from the partition 404 to the partition 402 across the interface 403.

Referring back to FIG. 3, the process 300 also includes generating a connectivity database of the signal net (operation 306). In some embodiments, in response to identifying the signal net, the DEF parser 202 may be configured to generate the connectivity database of the signal net by extracting a logic connectivity of the signal net based on the above-described DEF file of the integrated circuit design, which causes the connectivity database to include at least an identification of the signal net in the first partition, an identification of the signal net in the second partition, and an input pin of a destination cell of the signal net in the second partition.

Continuing with the same example shown in FIG. 4, the DEF parser 202 may generate the connectivity databases of the signal nets 410, 420, and 430 by using the respective interface port models, representations or descriptions (sometimes generally referred as interface port models) provided below. It is noted that the below interface port models are provided as examples for purposes of illustration and not intended to limit the present disclosure.

For the signal net 410, the code of the signal net 410 may be represented as:
PORTMAP N1
NET CPU N1
INST I1 A AND
INST CPU/I1 A INV
wherein the first line of the code "PORTMAP N1" may represent an identification of the signal net 410 in the partition 402, or an I/O port 411 from which the signal net 410 begins; the second line of the code "NET CPU N1" may represent an identification of the signal net 410 in the partition 404, and an I/O port 413 by which the signal net 410 traverses from the partition 402 to the partition 404 across the interface 403; the third line of the code "INST I1 A AND" may represent a branch of the signal net 410 in the partition 402 that ends at a pin 412A of an AND gate 412; and the fourth line of the code "INST CPU/I1 A INV" may represent an input pin 414A of a destination cell 414 of the signal net 410 in the partition 404, which is an inverter.

For the signal net 420, the code of the signal net 420 may be represented as:
PORTMAP N2
NET SOC N1
NET SOC/A N1
INST I1 B AND
INST SOC/A/I1 A INV
wherein the first line of the code "PORTMAP N2" may represent an identification of the signal net 420 in the partition 402, or an I/O port 421 from which the signal net 420 begins; the second line of the code "NET SOC N1" may represent an identification of the signal net 420 in the partition 406, and an I/O port 422 by which the signal net 420 traverses from the partition 402 to the partition 406 across the interface 405; the third line of the code "NET SOC/A N1" may represent an identification of the signal net 420 in the partition 408, and an I/O port 423 by which the signal net 420 traverses from the partition 406 to the partition 408 across the interface 407; the fourth line of the code "INST I1 B AND" may represent a branch of the signal net 420 in the partition 402 that ends at a pin 412B of the AND gate 412; and the fifth line of the code "INST SOC/A/I1 A INV" may represent an input pin 424A of a destination cell 424 of the signal net 420 in the partition 408, which is an inverter.

For the signal net 430, the code of the signal net 430 may be represented as:
PORTMAP N3
NET CPU N3
INST I1 A OUTPUT_BUFFER
wherein the first line of the code "PORTMAP N3" may represent an identification of the signal net 430 in the partition 402; the second line of the code "NET CPU N3" may represent an identification of the signal net 430 in the partition 404, and/or an I/O port 431 by which the signal net 430 traverses from the partition 404 to the partition 402 across the interface 403; the third line of the code "INST I1 A OUTPUT_BUFFER" may represent a branch of the signal net 430 in the partition 402 that ends at a pin A of an OUTPUT_BUFFER gate 432.

Referring back to FIG. 3, the process 300 also includes determining electrical characteristics associated with the signal net (operation 308). In some embodiments, in response to identifying the signal net, simultaneously or subsequently, the SPICE/SPEF analysis engine 204, timing analysis engine 206, and signal activity analysis engine 208 may be configured to respectively determine a number of electrical characteristics associated with the signal net.

More specifically, the SPICE/SPEF analysis engine 204 may extract information from the received SPICE model and/or SPEF file to determine the capacitance load of the signal net, which may include a capacitance load at the input pin of the destination cell, a capacitance load of the signal net in the first partition, and a capacitance load of the signal net in the second partition. In some embodiments, at least one of the SPICE model or SPEF file may include such capacitance load information. The timing analysis engine 206 may extract information from the received TWF to determine a slew rate and a signal arrival time at the input pin of the destination cell. In some embodiments, the TWF, which can be provided by performing static timing analysis on at least a portion of the integrated circuit design that comprises at least one of the destination cell, may include such timing information. The signal activity analysis engine 208 may extract information from the VCD or activity file to determine one or more signal transitions and signal states on the signal net or on the input pin of the destination cell. In some embodiments, the VCD or activity file, which can be provided by performing functional or gatelevel simulation on at least a portion of the integrated circuit design that comprises at least one of the signal net or destination cell, may include such signal activity information.

Using the signal net 410 of FIG. 4 as a representative example, the capacitance load of the signal net 410 may include a capacitance load 444 at the input pin 414A of the destination cell 414, a capacitance load 446 of the signal net 410 in the partition 402, and a capacitance load 448 of the signal net 410 in the partition 404. The slew rate and signal arrival time at the input pin 414A of the destination cell 414 may respectively include the rate of change of a signal, received at the input pin 414A, per unit time and when the signal actually arrives at the input pin 414A. The one or more signal transitions on the signal net 410 or on the input pin 414A of the destination cell 414 may include the toggling behavior between logic 1 and 0 of the signal received at the input pin 414A or present on the signal net 410. The signal states on the signal net 410 or on the input pin 414A of the destination cell 414 may include the logic states of the signal received at the input pin 414A or present on the signal net 410 over a certain period of time.

Referring back to FIG. 3, the process 300 also includes calculating power consumption of circuit elements in the first partition (operation 310). In some embodiments, in response to the generation or availability of the connectivity database and electrical characteristics associated with each of the identified signal nets, the power analysis engine 210 may generate an interface port model for each of the identified signal nets by combining its respective connectivity database and electrical characteristics, and can calculate the power consumption of circuit elements in the first partition (e.g., the partition where the signal net originates from) based on or using the respective interface port model. For example, the power analysis engine can calculate the dynamic switching power of each cell (in the first partition) driving any one of the identified signal nets that traverses the interface into the second partition. The power analysis engine can calculate the dynamic switching power of such a cell using for instance the capacitance or load on the respective net, and/or the signal activity on the respective net, as provided by the corresponding interface port model. This is in contrast to treating the second partition as a "black box" and assuming that the capacitance load due to the second partition is zero for instance, which can cause a significant underestimation in the power of the driving cell.

The process 300 can also include calculating power consumption of circuit elements in the second partition (operation 312). In some embodiments, simultaneously with, prior to, or subsequently to calculating the power consumption in the first partition, the power analysis engine 210 may use any relevant interface port model to calculate the power consumption of circuit elements in the second partition. For example, for a net that traverses from the first partition into the second partition to connect to an input pin of a cell in the second partition, the power analysis engine can calculate the power consumption of the cell using information of the interface port model corresponding to the net. For instance, the power analysis engine can account for the slew rate and/or state transition at the input pin, in calculating the power consumption of the cell. This is in contrast to treating the first partition as a "black box" and/or assuming a specific slew rate and/or state transition at the input pin for instance, which can cause a significant deviation between the calculated and actual power consumption levels of the driving cell.

As another example, for a net that traverses from the second partition into the first (or other) partition, the power analysis engine can access the capacitance loading information from the interface port model of the net. The power analysis engine can calculate the dynamic switching power of a cell driving the net, using the capacitance or load on the net, and/or the signal activity on the respective net, as provided by the interface port model. This is in contrast to treating the first (or other) partition as a "black box" and assuming that the capacitance load due to the first (or other) partition is zero or some other value for instance, which can cause a significant underestimation in the power of the driving cell.

The power analysis tool can calculate the power consumption of any other cell in the first partition and/or the second partition. The power analysis tool may sum all power consumption values determined for cells in each partition, to provide a total power consumption value or report for the respective partition. As mentioned above, a signal net may traverse over more than 2 partitions. As such, the power analysis engine 210 may calculate a respective power consumption of each cell connected to the signal net. The power analysis engine may aggregate, calculate, sum or combine power consumed by cells within a particular block or partition.

The process 300 also includes calculating power consumption of circuit elements in the integrated circuit design (operation 314). In some embodiments, responsive to calculating the power consumption of each partitions in the IC design, the power analysis engine 210 may calculate the power consumption of the whole integrated circuit design by combining the calculated power consumption of each of the partitions (e.g., the first and second partitions). The power analysis engine may aggregate, calculate, sum or combine power consumption values from each partition or block, to provide a total power consumption value or report for the IC design.

In some embodiments, in response to calculating the power consumption of the whole integrated circuit design, the power analysis engine 210 may output the power consumption data, which may be established as a file or files in any power consumption format (e.g., that indicates the power consumption of each cell and/or each block). The power analysis engine can output the power consumption data to the voltage drop engine 230 for calculating voltage drops of the integrated circuit design (e.g., across cells and/or blocks of the integrated circuit design). The voltage drop engine 230 can read, access, use and/or process the power consumption data (e.g., on a per cell basis), to determine voltage drops of the integrated circuit design.

Figure 5:
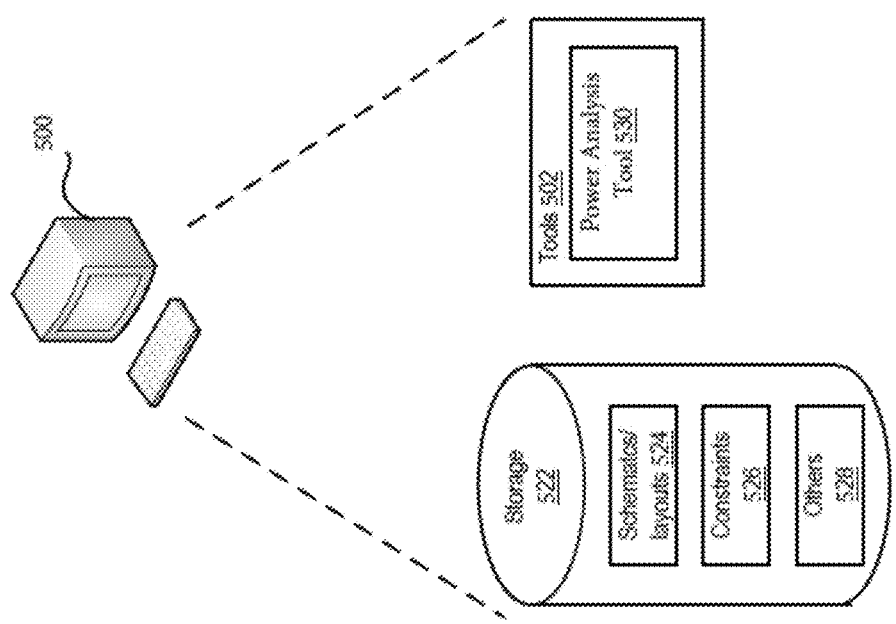
FIG. 5 is a functional block diagram illustrating an example system, according to the present embodiments.

FIG. 5 is a functional block diagram of an example system for facilitating and/or performing power analysis by generating an interface model on an integrated circuit, according to the present embodiments. In some embodiments, the system 500 can be one or more computers that are loaded with software (e.g., EDA tools) and/or customized to include hardware for interactively and/or automatically implementing designs of integrated circuits (e.g., ASICs, SoCs, full custom digital ICs). In some embodiments, the one or more computing systems 500 comprise various components not shown such as processor(s) or processor core(s), memory, disks, etc. The software and/or custom hardware may include interactive or automated modules such as a placer, a routing engine, a layout editor, a wire editor, a design rule checker, a verification engine, a module generator, and/or a floor-planner, as will be appreciated by those skilled in the art.

In one or more embodiments, the computing system 500 may further write to and read from a local or remote volatile or non-volatile computer accessible storage 522 that stores thereon data or information such as, but not limited to, one or more databases such as post-placement layouts, schematic design database(s) or physical design database(s) 524 (e.g., GDS II or OASIS data, etc.), libraries, rule decks, constraints (e.g., track specifications, minimum spacing, pitch/width requirements, widths, BCB rules), etc. 526, and/or other information or data 528 (e.g., trim shape locations) that may be required to support the methodology of the present embodiments. According to certain aspects, design rules in storage 526 are extendable or changeable (e.g., via APIs and the like) without changing other components or data in system 500.

In some embodiments, the one or more computing systems are implemented in a "cloud" configuration and/or a client/server configuration. For example, one or more server computers may be loaded with application software (e.g., a router and/or other EDA tool) for implementing some or all of the methodology of the present embodiments, and one or more client computers can communicate with the server computer(s) via a network to perform some or all of the methodology of the embodiments for a particular design.

In some embodiments, the one or more computing systems 500 may, by various standalone software, hardware modules or combinations thereof 502 (e.g., EDA tool), include a power analysis tool 530 that can generate an interface port model for an integrated circuit. The power analysis tool 530 can execute the process 300 discussed above in relation to FIG. 3. The power analysis tool 530 may be implemented by adapting or communicating with certain pre-existing modules (e.g., placer, router, layout editor, design rule checker) as may be required to implement a methodology to implement design rule correct IC designs according to the present embodiments and as described above. Those skilled in the art will be able to understand how to implement various examples of such modules after being taught by the present disclosure.

Although the present embodiments have been particularly described with reference to preferred ones thereof, it should be readily apparent to those of ordinary skill in the art that changes and modifications in the form and details may be made without departing from the spirit and scope of the present disclosure. It is intended that the appended claims encompass such changes and modifications.

What is claimed is:

1. A method of power analysis, comprising:
   partitioning an integrated circuit design into at least a first partition and a second partition sharing an interface with the first partition, for calculating power consumption of circuit elements in the first partition;
   generating a connectivity database of a signal net traversing from the first partition to the second partition across the first interface, the connectivity database comprising an identification of the signal net in the first partition, the signal net in the second partition, and an input pin of a destination cell of the signal net in the second partition;
   determining a slew rate and a signal arrival time at the input pin of the destination cell, a capacitance load of the signal net, and one or more signal transitions and signal states on the signal net or on the input pin of the destination cell; and
   calculating the power consumption of the circuit elements in the first partition using the generated connectivity database, the slew rate and the signal arrival time at the input pin of the destination cell, the capacitance load of the signal net, and the one or more signal transitions and signal states on the signal net or on the input pin.

2. The method of claim 1, wherein partitioning the integrated circuit design comprises partitioning the integrated circuit design into a hierarchical design wherein one of the first partition or the second partition is a design sub-block of another one of the first partition or the second partition.

3. The method of claim 1, comprising generating the connectivity database by extracting data from a design exchange format (DEF) file.

4. The method of claim 1, comprising determining the slew rate and the signal arrival time at the input pin of the destination cell by performing static timing analysis on at least a portion of the integrated circuit design comprising the destination cell.

5. The method of claim 1, comprising determining the capacitance load of the signal net by combining at least two of: a capacitance load at the input pin of the destination cell, a capacitance load of the signal net in the first partition, and a capacitance load of the signal net in the second partition.

6. The method of claim 1, comprising determining the capacitance load of the signal net from a standard parasitic exchange format (SPEF) file or a simulation program with integrated circuit emphasis (SPICE) model.

7. The method of claim 1, comprising determining the one or more signal transitions and signal states by performing functional simulation on at least a portion of the integrated circuit design comprising at least one of the signal net or the destination cell.

8. The method of claim 1, comprising determining the one or more signal transitions and signal states from a value change dump (VCD) file or other simulation activity file.

9. The method of claim 1, further comprising calculating power consumption of the circuit elements in the second partition, and determining power consumption for the integrated circuit design by combining the calculated power consumption of the circuit elements in the first partition and the calculated power consumption of the circuit elements in the second partition.

10. The method of claim 1, further comprising performing a voltage drop analysis for the integrated circuit design using the determined power consumption for the integrated circuit design.

11. A system for power analysis, comprising one or more processors, the one or more processors configured to:
identify a first partition of an integrated circuit design and a second partition of the integrated circuit design sharing an interface with the first partition, for calculating power consumption of circuit elements in the first partition;
generate a connectivity database of a signal net traversing from the first partition to the second partition across the first interface, the connectivity database comprising an identification of the signal net in the first partition, the signal net in the second partition, and an input pin of a destination cell of the signal net in the second partition;
determine a slew rate and a signal arrival time at the input pin of the destination cell, a capacitance load of the signal net, and one or more signal transitions and signal states on the signal net or on the input pin of the destination cell; and
calculate the power consumption of the circuit elements in the first partition using the generated connectivity database, the slew rate and the signal arrival time at the input pin of the destination cell, the capacitance load of the signal net, and the one or more signal transitions and signal states on the signal net or on the input pin.

12. The system of claim 11, wherein the integrated circuit design is a hierarchical design, and one of the first partition or the second partition is a design sub-block of another one of the first partition or the second partition.

13. The system of claim 11, wherein the one or more processors are configured to generate the connectivity database by extracting data from a design exchange format (DEF) file.

14. The system of claim 11, wherein the one or more processors are configured to determine the slew rate and the signal arrival time at the input pin of the destination cell by performing static timing analysis on at least a portion of the integrated circuit design comprising the destination cell.

15. The system of claim 11, wherein the one or more processors are configured to determine the capacitance load of the signal net by combining at least two of: a capacitance load at the input pin of the destination cell, a capacitance load of the signal net in the first partition, and a capacitance load of the signal net in the second partition.

16. The system of claim 11, wherein the one or more processors are configured to determine the capacitance load of the signal net from a standard parasitic exchange format (SPEW) file or a simulation program with integrated circuit emphasis (SPICE) model.

17. The system of claim 11, wherein the one or more processors are configured to determine the one or more signal transitions and signal states by performing functional simulation on at least a portion of the integrated circuit design comprising at least one of the signal net or the destination cell.

18. A computer readable storage medium having instructions stored thereon which, when executed by a computer, cause the computer to execute a method, the method comprising:
identifying a first partition of an integrated circuit design and a second partition of the integrated circuit design sharing an interface with the first partition, for calculating power consumption of circuit elements in the first partition;
generating a connectivity database of a signal net traversing from the first partition to the second partition across the first interface, the connectivity database comprising an identification of the signal net in the first partition, the signal net in the second partition, and an input pin of a destination cell of the signal net in the second partition;
determining a slew rate and a signal arrival time at the input pin of the destination cell, a capacitance load of the signal net, and one or more signal transitions and signal states on the signal net or on the input pin of the destination cell; and
calculating the power consumption of the circuit elements in the first partition using the generated connectivity database, the slew rate and the signal arrival time at the input pin of the destination cell, the capacitance load of the signal net, and the one or more signal transitions and signal states on the signal net or on the input pin.

19. The computer readable storage medium according to claim 18, the method further comprising generating the connectivity database by extracting data from a design exchange format (DEF) file.

20. The computer readable storage medium according to claim 18, the method further comprising determining the slew rate and the signal arrival time at the input pin of the destination cell by performing static timing analysis on at least a portion of the integrated circuit design comprising the destination cell.

* * * * *